Feb. 23, 1943.   O. E. ESVAL   2,311,652
GYROSCOPIC HORIZON
Filed March 20, 1940   3 Sheets-Sheet 1
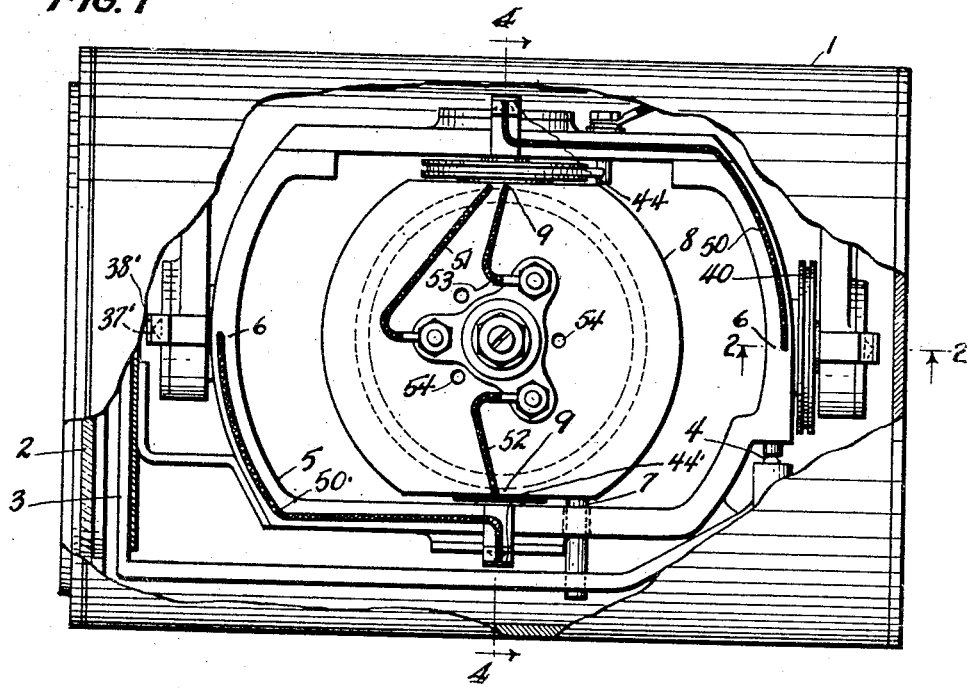
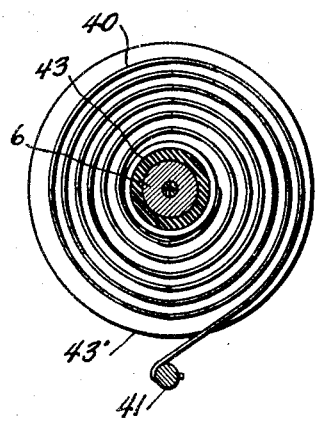
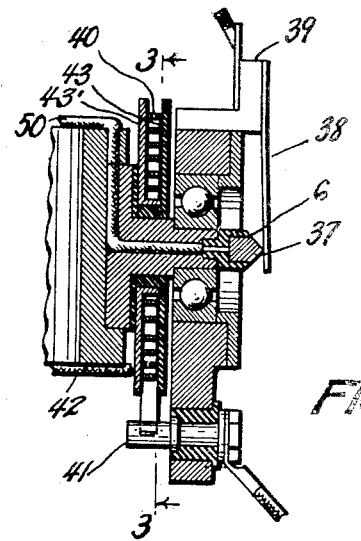
INVENTOR
ORLAND E. ESVAL,
BY Herbert H. Thompson
his ATTORNEY.

Feb. 23, 1943.   O. E. ESVAL   2,311,652
GYROSCOPIC HORIZON
Filed March 20, 1940   3 Sheets-Sheet 2

INVENTOR
ORLAND E. ESVAL,
BY
Herbert H. Thompson
his ATTORNEY.

Feb. 23, 1943.　　　O. E. ESVAL　　　2,311,652
GYROSCOPIC HORIZON
Filed March 20, 1940　　　3 Sheets-Sheet 3

INVENTOR
ORLAND E. ESVAL,
BY
Herbert H. Thompson
his ATTORNEY.

Patented Feb. 23, 1943

2,311,652

UNITED STATES PATENT OFFICE 2,311,652

GYROSCOPIC HORIZON

Orland E. Esval, Allendale, N. J., assignor to Sperry Gyroscope Company, Inc., Brooklyn, N. Y., a corporation of New York Application March 20, 1940, Serial No. 324,957

3 Claims. (Cl. 74—5)

This invention relates to gyroscopic artificial horizons, sometimes referred to as gyro-verticals. More particularly, my invention relates to improvements in the type of this class of instruments which is widely used on airplanes for assisting in maintaining level flight.

According to my invention, I propose to spin the rotor electrically instead of by air, but to retain the present air erection device, utilizing the current of air generated by the spin of the rotor for the erection device without employing any impeller on the rotor.

Another object of the invention is to secure a more compact structure in which a goodly portion of the erection device is housed within the body of the rotor casing.

A further object of the invention is to improve the method of leading in three-phase supply to the rotor through the gimbal axes.

Referring to the drawings showing the form of the invention now preferred:

Fig. 1 is a plan view of my artificial horizon with the casing broken away to show the interior.

Fig. 2 is a vertical section through the gimbal trunnion, taken approximately on line 2—2 of Fig. 1.

Fig. 3 is a detail showing the hair spring used to lead in one phase of the supply at each gimbal axis.

Figure 4:
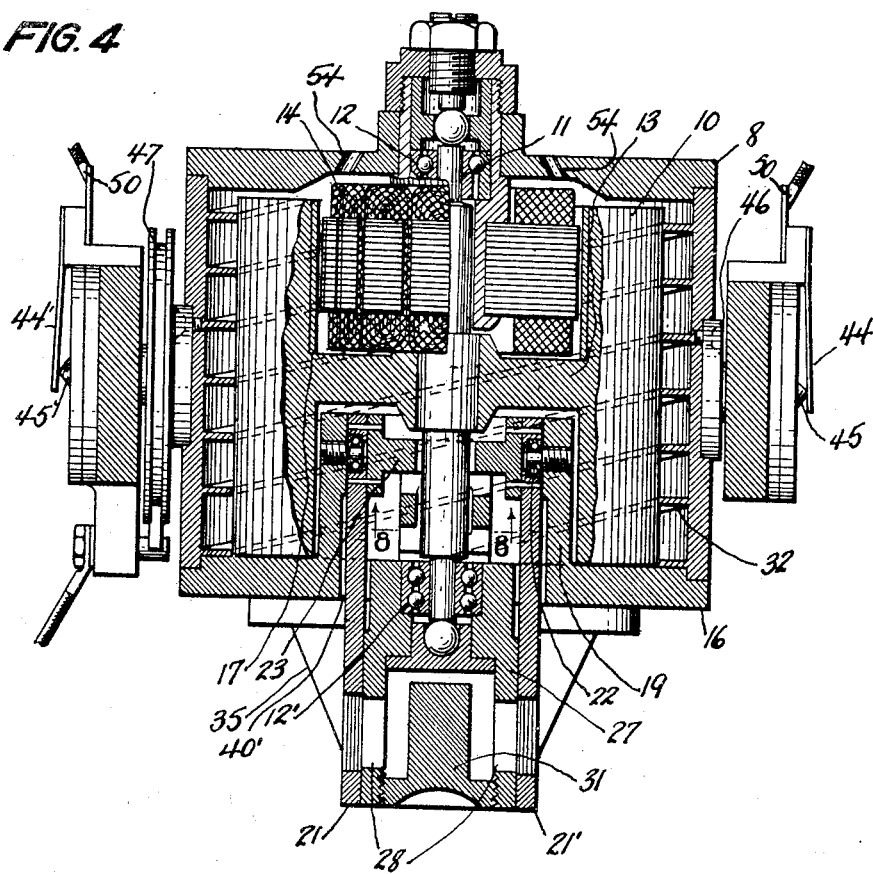
Fig. 4 is a vertical section through the gyroscope, taken substantially on line 4—4 of Fig. 1.
Figure 6:
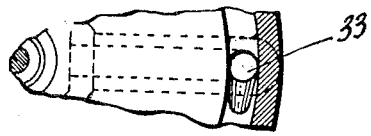
Fig. 6 is a horizontal detailed section taken on line 6—6 of Fig. 5.
Figure 5:
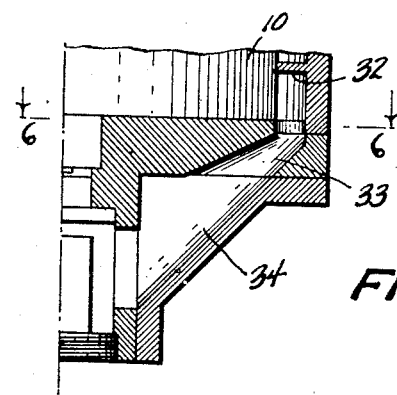
Fig. 5 is a detailed section of the lower portion of the casing taken on a 45° angle to Fig. 4.
Figure 7:
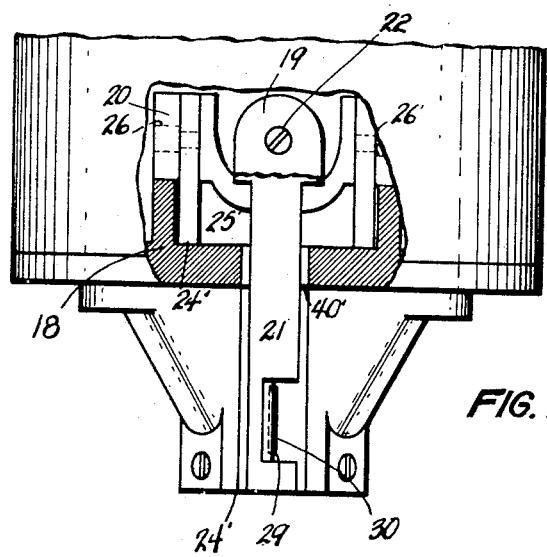
Fig. 7 is a front elevation, partly in section, of the lower portion of the gyro casing viewed from the left in Fig. 1.
Figure 8:
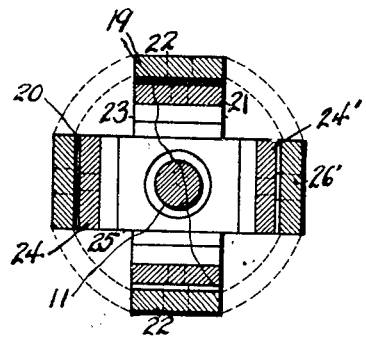
Fig. 8 is a section viewed from below, taken approximately on line 8—8 of Fig. 4.

My artificial horizon or gyro-vertical may be constructed in the conventional form, being shown as housed within an outer casing 1 having a front window 2 through which the horizon bar 3, which is stabilized about both horizontal axes of the gyro, may be viewed. Said bar is pivoted in the usual manner at 4 to the rear of a gimbal ring 5, the bar hence moving with the gimbal about the fore and aft major trunnion axis 6—6 of the gimbal ring. Up and down movement is imparted to the bar in the usual manner by a pin 7 extending laterally from the rotor casing 8 of the gyroscope through a slot in the gimbal ring 5, and extending through a horizontal slot (not shown) in a rearward extension of the bar 3. The rotor casing 8 is, in turn, pivotally mounted on a normally horizontal trunnion axis 9—9 within the gimbal ring 5. Within the rotor casing 8 is journaled the rotor 10 on a vertical shaft 11 and upper and lower rotor bearings 12 and 12'.

The rotor preferably is joined to the shaft only by a central web 13, the rim of the rotor extending a substantial distance above and below the web. The upper portion of the rim is shown as enclosing a three-phase stator 14 of an induction motor for spinning the same. For simplicity, a squirrel cage, as such, is not employed on the inner face of the rim of the rotor, but a thin ring of copper 17 is secured to said face instead.

The lower overhang of the rotor is shown as housing a goodly portion of the erection mechanism employed for the gyroscope. For this purpose, the bottom cap 16 of the casing 8 has a ring 18 therein extending upwardly within the rotor. Said ring is provided with two pairs of upstanding ears 19 and 20. One pair 19 pivotally supports small pendulums 21 and 21' on bearings 22 well within the confines of the rotor overhang and above the lower rotor bearings 12'. Said pendulums are cross connected by member 23, having a hole therein of larger diameter than the rotor shaft 11 to permit clearance. The other pair of ears 20 pivotally supports a second pair of pendulums 24 and 24' which are cross connected by a U-shaped member 25 also provided with a clearance hole for the shaft 11. The pendulums pass through clearance slots 40' in plate 16. Preferably, the pivots 22 for the pendulums 21 and 21' and pivots 26 for the outer pair of pendulums 24 and 24' lie in the same horizontal plane.

The bottom plate 16 is also provided with a downward central extension 27 which houses the lower bearing 12' and which has therein two pairs of air ports 28 and 29 with which the knife edges 30 on the lower portions of the several pendulums cooperate. To this end, the lower portion of the extension 27 is made hollow, being closed at the lower end by a plug 31. Air under moderate pressure is supplied to the interior thereof from the rotor. For this purpose, I place on the interior of the housing or casing 8 a continuous spiral rib 32 which receives the air drawn in through inclined holes 54 in the top of the casing near the bearing housing and thrown tangentially from the smooth periphery of the rotor, and directs it downwardly to the bottom of the casing, whence it is discharged through inclined openings 33 in the bottom thereof, connecting with passageways 34 in channel blocks 35 leading downwardly to within the chamber 36. In this manner, a continuous flow is obtained without materially retarding the rotor and without placing blades thereon which render the balancing operation difficult. In addition, the air entering through the inner holes 54 circulates over the stator windings and therefore helps cool the same.

Three-phase current is shown as being led into the gyroscope in a novel manner. One lead is led into the gimbal ring by providing the end of the trunnion 6 with a pointed hardened metallic button 37 with which a spring arm 38 secured to the fixed bracket 39 lightly contacts. Button 37 has connected thereto an insulated wire 50 which leads to a similar flat spring 44 on the minor axis of the gimbal. Another lead is led through a similar spring arm 38' and contact 37' on the opposite trunnion 6, the contact being connected by wire 50' to spring 44'. The third lead is carried through the trunnion axis by means of a light hair spring 40 connected at one end to the fixed terminal 41 and at the other end to a wire 42 on the gimbal ring which is soldered at one end to metal disc 43'. Said spring is shown as coiled between said metallic disc 43' and an insulating collar and disc 43 mounted on the trunnion 6. The current may likewise be led through the minor trunnion axes 9—9 by the two flat springs 44 and 44' fixed to the gimbal ring and which contact with hardened contact points 45 and 45' on the end of the trunnions 46 projecting from the sides of the casing 8. The third lead may similarly be carried through a coiled hair spring 47. From these points wires 51, 52 and 53 lead within the rotor case to the stator windings.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In a gyro-vertical, a rotor casing, a rotor having a central web connecting the same to a normally vertical shaft journalled in the casing, an overhang of the rotor extending from the top and bottom of the central web, an electrical stator for spinning the rotor disposed within the top overhang, an air erection pendulum device supported by the casing and extending within the bottom overhang, and means for directing the air thrown from the periphery of the spinning rotor into said erection device.

2. In an air erected gyro-vertical, a rotor casing, a rotor having a substantially central web connecting the same to a normally vertical shaft journalled in the casing, an overhang of the rotor extending from the bottom of the substantially central web, a plurality of pendulous shutters pivoted on said casing within the rotor overhang and extending below said casing through apertures provided in the bottom thereof, and a hollow extension on the bottom of said casing having ports therein with which the shutters cooperate.

3. A gyro-vertical as claimed in claim 1, in which the pivotal axes of the pendulous shutters are located above the lower journalled portion of the rotor shaft.

ORLAND E. ESVAL.

CERTIFICATE OF CORRECTION.

Patent No. 2,311,652. February 23, 1943.

ORLAND E. ESVAL.

It is hereby certified that error appears in the printed specification of the above numbered patent requiring correction as follows: Page 2, second column, line 32, claim 3, for the words "in claim 1" read --in claim 2--; and that the said Letters Patent should be read with this correction therein that the same may conform to the record of the case in the Patent Office.

Signed and sealed this 6th day of April, A. D. 1943.

(Seal)

Henry Van Arsdale,
Acting Commissioner of Patents.